US007567716B2

(12) United States Patent
Henry et al.

(10) Patent No.: US 7,567,716 B2
(45) Date of Patent: Jul. 28, 2009

(54) METHOD AND DEVICE FOR RANDOMLY ACCESSING A REGION OF AN ENCODED IMAGE FOR THE PURPOSE OF DECODING IT AND A METHOD AND DEVICE FOR ENCODING AN IMAGE

(75) Inventors: Félix Henry, Rennes (FR); Christophe Gisquet, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 765 days.

(21) Appl. No.: 11/217,607

(22) Filed: Sep. 2, 2005

(65) Prior Publication Data

US 2006/0088221 A1    Apr. 27, 2006

(30) Foreign Application Priority Data

Sep. 3, 2004    (FR) .................................. 04 09347

(51) Int. Cl.
  *G06K 9/36*    (2006.01)
(52) U.S. Cl. ..................................... 382/232
(58) Field of Classification Search .................. 341/51, 341/65, 67; 375/240.01, 240.03, 240.2, 240.11, 375/240.15, 240.23, 240.27; 358/426.13, 358/426.14; 348/384.1, 394.1–395.1, 404.1, 348/424.2, 431.1; 382/232–233, 240, 244–248, 382/250–252
See application file for complete search history.

(56) References Cited

U.S. PATENT DOCUMENTS 5,680,129 A * 10/1997 Weinberger et al. ............ 341/65

| 5,835,034 | A | * | 11/1998 | Seroussi et al. | ................ 341/65 |
| 6,385,251 | B1 | * | 5/2002 | Talluri et al. | ........... 375/240.27 |
| 6,621,869 | B2 | * | 9/2003 | Talluri et al. | ........... 375/240.27 |
| 6,650,784 | B2 | * | 11/2003 | Thyagarajan | ................ 382/244 |
| 6,771,828 | B1 | * | 8/2004 | Malvar | ........................ 382/240 |
| 2006/0050789 | A1 | | 3/2006 | Gisquet et al. | ......... 375/240.23 |

FOREIGN PATENT DOCUMENTS

JP    2000/089742 A    3/2000
WO    WO 00/60873 A    10/2000

OTHER PUBLICATIONS

ISO/IEC JTC1/SC29/WG11 N3312, MPEG-4 Video Verification Model 16.0, Wavelet Tiling, Mar. 2000, pp. 361-363, XP002324438.
Patent Abstracts of Japan, vol. 2000, No. 06, Sep. 22, 2000, JP 2000 089742 A, European Patent Office.

* cited by examiner

*Primary Examiner*—Jose L Couso
(74) *Attorney, Agent, or Firm*—Fitzpatrick, Cella, Harper & Scinto (57) ABSTRACT

A method for accessing a region of an encoded image comprising a plurality of segments that are encoded and put in order of encoding. The method includes the following steps applied to encoded segments and by going through the segments in the opposite direction to their order: comparing the position of the current encoded segment with the region of the image to be accessed, and according to the result of the comparison, deciding as to the decoding of the current encoded segment.

42 Claims, 7 Drawing Sheets

METHOD AND DEVICE FOR RANDOMLY ACCESSING A REGION OF AN ENCODED IMAGE FOR THE PURPOSE OF DECODING IT AND A METHOD AND DEVICE FOR ENCODING AN IMAGE

FIELD OF THE INVENTION

The present invention relates to a method and device for accessing a region of an encoded image for the purpose of decoding it, the region of the image to be accessed being randomly defined, and a method and device for encoding an image.

The random access consists of accessing a part of a file representing the encoded image. This part, defined for example by a user, is then decoded in order to reconstruct the portion of the image to be accessed.

The invention is in the field of the accessing of encoded images.

It will be noted that the invention is situated in the field of the encoding and compression of digital images and more generally, the encoding and compression of digital video, audio and data signals.

BACKGROUND OF THE INVENTION

An image, for example from a digital camera, is constituted by a set of N×M pixels, where N is the height of the image in pixels and M the width of the image. The image so obtained is encoded and compressed before being stored in memory. The initial data, that is to say the information representing the pixels of the image, are organized in a bidirectional array, that is for example accessible row by row.

It is known that the decoding of digital images requires a relatively high memory capacity as well as a long processing time.

For this reason, numerous studies have been made over several years with the object of rapidly and advantageously accessing a part of the image and only to decode the region of the image to be accessed.

For example, in the case in which a user wishes to access a region of an image, it is desirable to be able to access solely that portion of the encoded image, which means that only the region selected by the user must be decoded.

For this, a method is known of randomly accessing a file while keeping up to date a list of offsets, as described in the state of the art according to the following reference: http://megara.ee.nctu.edu.tw/course/PL03/Ch14.pdf.

This list makes it possible to access different parts of a file in jumps without having to sequentially go through the entirety of the data of the file.

Similarly, in the JPEG2000 specification, with reference to the following address, http://www.ee.unsw.edu.au/~taubman/publications_files/remote-browsing-icip02.pdf, it is also possible to randomly access an image.

The drawback of these approaches is due to the fact that the writing of the offset information, that is to say the information making it possible to go through the file, during the phase of encoding the image, is an inappropriate process for continuous processing. This is because it requires the interruption of the process of writing the encoded file in order to write the offset information.

The object of the present invention is to remedy at least one of the aforementioned drawbacks by providing a linear encoding method which can in particular make it possible to work without saving to memory and a method for accessing a region of an encoded image and the associated devices.

SUMMARY OF THE INVENTION

According to a first aspect, the object of the present invention is to provide a method for accessing a region of an encoded image comprising a plurality of segments that are encoded and put in order of encoding. The method comprises the steps described below applied to encoded segments of the encoded image and by going through the segments in the opposite direction to their order. The method comprises the following steps:

comparing the position of the current encoded segment with the region of the image to be accessed;

according to the result of the comparison, deciding as to the decoding of the current encoded segment.

Thus the method of accessing a region of an encoded image makes provision for going through the encoded segments of the image in the opposite direction to their order, and then for deciding to decode the encoded segments situated at least partially in the region of the image to be accessed, the other segments not having to be decoded.

Beforehand, the segments are encoded and put in a specific order.

The region of the image to be accessed is decoded by applying the decoding solely to a part of the encoded image, this part being substantially proportional to the size of the region.

Moreover, since only the segments situated at least partially in the region of the image to decode are actually decoded, the processing time is greatly reduced. Thus, it is not necessary to decode the entirety of the encoded image when it is desired to access solely a region of the encoded image.

According to one feature, going through the segments in the opposite direction to their order comprises a step of positioning at the preceding segment with respect to the current segment already gone through. The positioning step is in particular performed according to a step of determining the address of the preceding encoded segment on the basis of the address of the current encoded segment.

This feature makes it possible to go through the segments in such a manner that, on the basis of the address of the current segment, it is possible to access the address of the start of the preceding segment. It is thus possible to go through the segments of the encoded image rapidly without having to read all the encoded information of the image.

According to a particular feature, an item of information representing the size of the encoded segment is associated with each encoded segment of the image.

This item of information is used to efficiently go through the segments. It represents an item of information on the offset from the current position in order to reach the preceding segment.

According to another feature, the encoded segment is followed in the direction of the order by the item of information representing the size of the encoded segment.

This is because, given that the segments of the encoded image will be gone through in the opposite direction to their order, it is advantageous for the size of the encoded segment to be indicated after that encoded segment.

An advantage of this representation lies in the fact that the encoding may be performed "in continuous flow", without the need either for interruption during encoding for writing the offset information in a specific place in the file, or for inserting the information afterwards. Thus the encoding performance is improved, without however leading to an excess penalty in terms of size.

For example, the item of information representing the size of the encoded segment is encoded over a predetermined number of bits.

More particularly, on the basis of the current address, given that the number of bits for the encoding of the size of a segment is determined, it is easy to position the current address at the address at which the size of the preceding segment is encoded and to determine that value.

According to one feature, the positioning step referred to above is more particularly performed first of all by obtaining the item of information representing the size of the preceding encoded segment, then by determining the address of the preceding encoded segment, on the basis of the address of the current encoded segment and of the item of information obtained.

Determining the address on the basis of the address of the current segment consists in obtaining the size of the preceding segment, this information being, for example, stored over a specific number of bits. This information is thus obtained, for example, by offsetting the current address by the number of bits over which the size is encoded. After obtaining the size, the current address will undergo an offset corresponding to the value of the size in order to be positioned at the preceding segment.

The segment of which the address is so determined then becomes the current segment. It is next compared to the region of the image to be accessed, as mentioned above, and may possibly be decoded.

According to one feature, the method is applied to encoded segments for as long as the current encoded segment belongs to a row of the region of the image to be accessed.

More particularly, the going through process is advantageously continued for as long as segments remain which belong to a row of the region of the image to be accessed, so significantly improving the performance of the method.

More particularly, the image is not gone through in its entirety, but only for as long as the current segment is below the highest row of the region of the image to be accessed.

According to one feature, each segment composing the image breaks down into a plurality of samples and the decoding of the current encoded segment comprises the steps described below applied to samples of the current encoded segment.

A first step is a step of comparing a current sample with the region of the image to be accessed, then, depending on the result of the comparison, the second step is a step of deciding as to decoding or not decoding the current sample.

More particularly, it is thus verified that each sample of a segment belongs to the region of the image to be accessed. If this is the case, it is then decided to decode the sample.

According to one feature, the step of comparing the current sample with the region of the image to be accessed comprises more particularly comparing the position of the current sample with the right hand end of the region of the image to be accessed.

More particularly, in order to improve the performance of the decoding of the samples belonging to the region of the image to be accessed, the method provides for performing a comparison of the sample with the right-hand region of the region to access. Thus, if the sample is situated to the right of the region, the current segment does not belong to the region of the image to decode and thus there is no use in decoding that sample.

According to one feature, the method of decoding a sample comprises a step of decoding using one type of decoding of at least two types of decoding.

Considering in more detail, the samples may be decoded using one type of decoding of at least two given types of decoding, depending on their encoding, or even more given types of decoding (3, 4, etc.).

More particularly, the samples are decoded using a first type of decoding, in particular a Rice-Golomb decoding or using a second type of decoding, in particular an Escape decoding.

More particularly, the type of decoding to apply to the current sample depends on a feature present in that sample.

According to one embodiment, the feature is the length of the prefix of the Rice-Golomb code.

According to one feature, the segments are more particularly put in order going from the first segment of the first row of the image until the last segment of the last row of the image.

Using this linear order, going through the segments is greatly simplified.

According to a second aspect, the invention also concerns a method of encoding an image comprising a plurality of segments. The method comprises the following steps applied to segments in order of encoding:

encoding of the current segment, inserting an item of information representing the size of the encoded segment after the current encoded segment in the direction of the order of encoding.

Thus the encoding provides for going through the segments of an image in encoding order, and in that order, to encode the segments and insert the information representing the size of the encoded segment, thus the encoding process may be performed continuously, without interruption to write the information representing the size of the encoded segment in a specific place in the file. More particularly, the information representing the size is written immediately after each segment, so making it possible to preserve an architecture of a continuous flow encoding means, without needing to insert the information in the file afterwards.

In addition, the method of encoding can be used for the preparation of temporary encoded data.

Thus, the data which is encoded by the above method corresponds to such temporary encoded data which is under an intermediate data format.

This temporary encoded data is then modified into a common data format which can be used by any common decoding devices receiving the encoded data.

More particularly, the temporary encoded data is modified by including the information representing the size of the encoded data in a header, this header being readable by any common decoding devices.

According to one feature, the item of information representing the size of the encoded segment is encoded over a predetermined number of bits.

According to another feature, each segment of the image comprises a plurality of samples, and the encoding of the current segment comprises the following steps applied to at least one sample of a current segment:

simulating encoding of a sample using a first type of encoding, depending on the result of the simulation, deciding as to encoding of the sample using said first type of encoding or as to encoding using at least one second type of encoding.

According to one feature, deciding as to the type of encoding depends on the size of the encoded sample resulting from the simulation of the encoding of that sample using the first type of encoding.

This is because, given that certain types of encoding may produce code of extremely great length, an encoding simulation makes it possible to determine in advance the size of the encoded sample before actually encoding it. Depending on the result, it is thus possible to decide to adapt the type of encoding appropriate for the sample.

Thus, the encoding is adapted according to the size of the sample to encode.

For example, the first type of encoding is a Rice-Golomb encoding and the second type of encoding is an Escape encoding.

In fact, Rice-Golomb encoding provides high compression efficiency, and Escape encoding enables the segment to be encoded while limiting the growth in size of a segment.

More particularly, the encoding of the first sample of a segment is of a type different from the first and second type of encoding.

In a complementary manner, the invention also provides a device for accessing a region of an encoded image comprising a plurality of encoded segments and put in the order of encoding. The device comprises the following means adapted to act on encoded segments by going through the segments in the opposite direction to their order.

means for comparing the position of the current encoded segment with the region of the image to be accessed;

means for deciding as to the decoding of the current encoded segment according to the result of the comparison.

This device has the same advantages as the method briefly described above.

According to one feature, for going through the segments in the opposite direction to their order, the device comprises means for positioning at the preceding segment with respect to the current segment already gone through, which implement in particular means for determining the address of the preceding encoded segment on the basis of the address of the current encoded segment.

Going through in this manner enables rapid access to the segments of the region to be accessed and thus a high decoding speed.

According to a particular feature, an item of information representing the size of the encoded segment is associated with each encoded segment of the image.

According to another feature, the encoded segment is followed in the direction of the order by the item of information representing the size of the encoded segment.

For example, the item of information representing the size of the encoded segment is encoded over a predetermined number of bits.

According to one feature, the positioning means are formed using the following means:

means for obtaining the item of information representing the size of the preceding encoded segment in the direction of the order, means for determining the address of the preceding encoded segment, on the basis of the address of the current encoded segment and of the item of information obtained.

According to one feature, each segment composing the image breaks down into a plurality of samples and the means for decoding the current encoded segment comprise the means described below adapted to act on samples of the current encoded segment:

means for comparing a current sample with the region of the image to be accessed;

means for deciding as to the decoding of the current sample according to the result of the comparison.

According to one feature, the means for comparing the current sample with the region of the image to be accessed comprise more particularly means for comparing the position of the current sample with the right hand end of the region of the image to be accessed.

According to another feature, the decoding device comprises means for decoding using one type of decoding of at least two types of decoding.

More particularly, a first type of decoding is a Rice-Golomb decoding and a second type of decoding is an Escape decoding.

More particularly, the type of decoding to apply depends on a feature present in the current sample.

According to one embodiment, the feature is the length of the prefix of the Rice-Golomb code.

According to one feature, the segments are put in order going from the first segment of the first row of the image until the last segment of the last row of the image.

In a complementary manner, the invention also provides a device for encoding an image in the manner briefly described below.

The device according to the invention for encoding an image comprising a plurality of segments comprises the means described below adapted to act on segments in encoding order:

means for encoding the current segment, means for inserting an item of information representing the size of the encoded segment after the current encoded segment in the direction of the order of encoding.

Thus the means for inserting an item of information representing the size of the encoded segment inserts that item of information after the encoded segment in the direction of the order of encoding by the encoding means. Such a device implies a that a very low-cost implementation can be achieved, while providing a very high compression speed.

According to one feature, the item of information representing the size of the encoded segment is encoded over a predetermined number of bits.

According to another feature, each segment composing the image breaks down into a plurality of samples and the means for encoding the current segment comprise the means described below adapted to act on at least one sample of a current segment:

means for simulating encoding of a sample using a first type of encoding, means for deciding as to encoding of the sample using said first type of encoding or as to encoding using at least one second type of encoding, depending on the result of the simulation.

According to another feature, the means for deciding as to the type of encoding depend on the resulting size of the encoding simulation of the sample using the first type of encoding.

For example, the first type of encoding is a Rice-Golomb encoding and a second type of encoding is an Escape encoding.

According to a particular embodiment, the encoding of the first sample of a segment is of a type different from the first and second type of encoding.

According to other aspects, the invention also concerns a telecommunications system, as well as computer programs for an implementation of the methods of the invention briefly described above.

Other features and advantages of the present invention will emerge more clearly from a reading of the following description, made with reference to the accompanying drawings.

DETAILED DESCRIPTION

Figure 1:
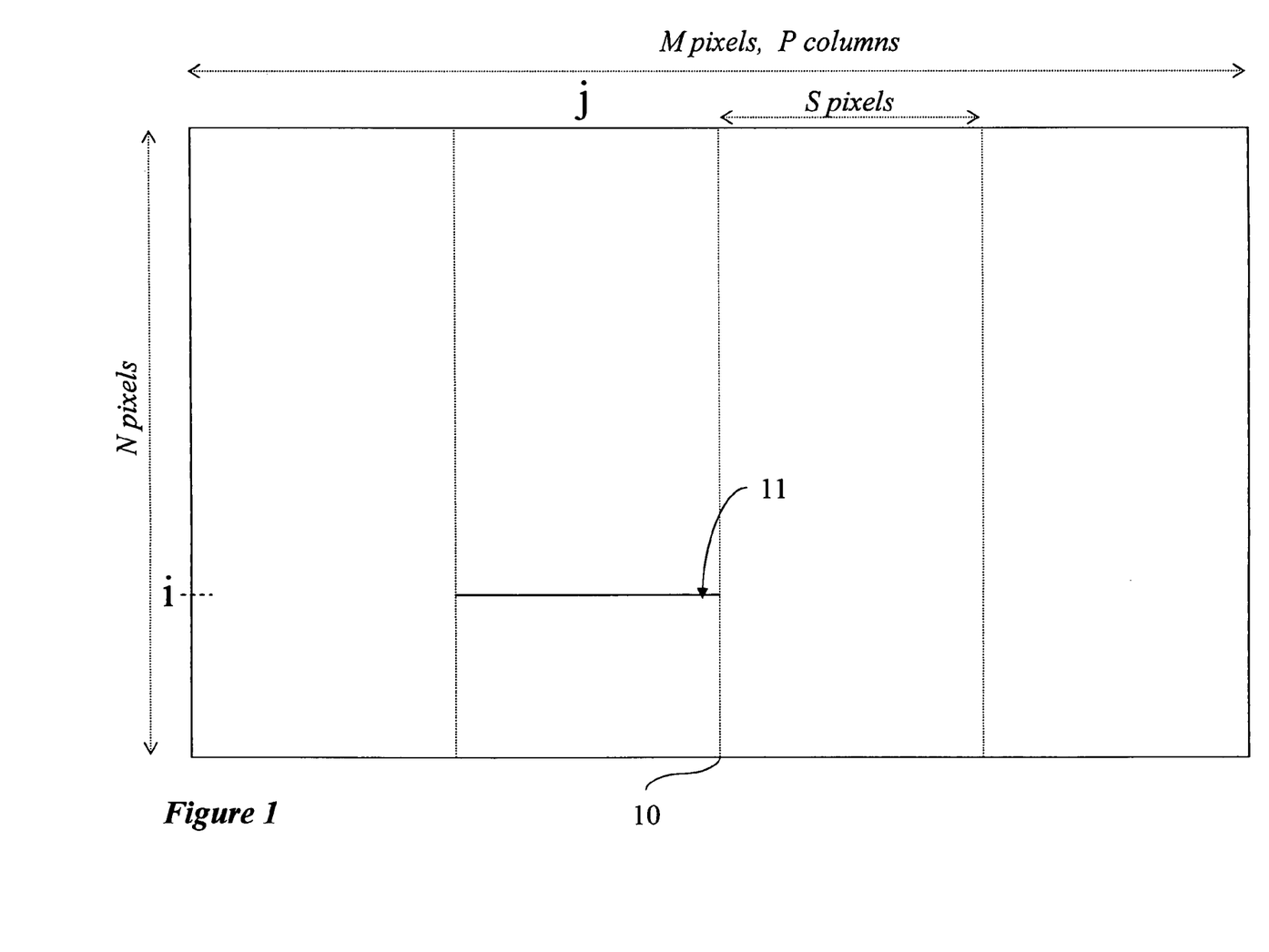
FIG. 1 represents an image and its decomposition into rows and columns.

As represented in FIG. 1, an image is constituted by a set of N×M pixels, where N is the height of the image in pixels and M the width of the image.

The image is divided along its height into rows of successive samples. The image is subdivided into P columns each S pixels wide.

These columns are chosen of equal size across all the rows in the embodiment described here.

However, according to a first variant, it is envisaged to have variable sizes of columns, or according to a second variant, it is envisaged only to have one segment per row, so giving rise to equivalence between row and segment.

The S pixels common to a column and to a row form a segment. Thus, for example, the segment (i,j) (segment 11 of FIG. 1) is the segment which contains the pixels common to the row of number i and to the column of number j.

Alternatively, a segment may be represented by the intersection of a set of rows with a column.

The initial data, that is to say the information held by the pixels of the image, are organized in a bidirectional array, that is for example accessible row by row.

According to one mode of representing these data, they are encoded over 12 bits and thus each pixel of the image may take a value between 0 and 4095.

These data are, for example, arranged in a Bayer array, that is to say with two channels alternating on a row, the channel comprising the set of samples corresponding to one color.

The colors may be represented in the RGB (Red, Green, Blue) mode. The order in the Bayer array implies regular alternating of the rows of type [RGRG . . . RG] and of rows of type [GBGB . . . GB]. Other types of interleaving of the channels are however possible in variant embodiments of the invention.

Figure 2:
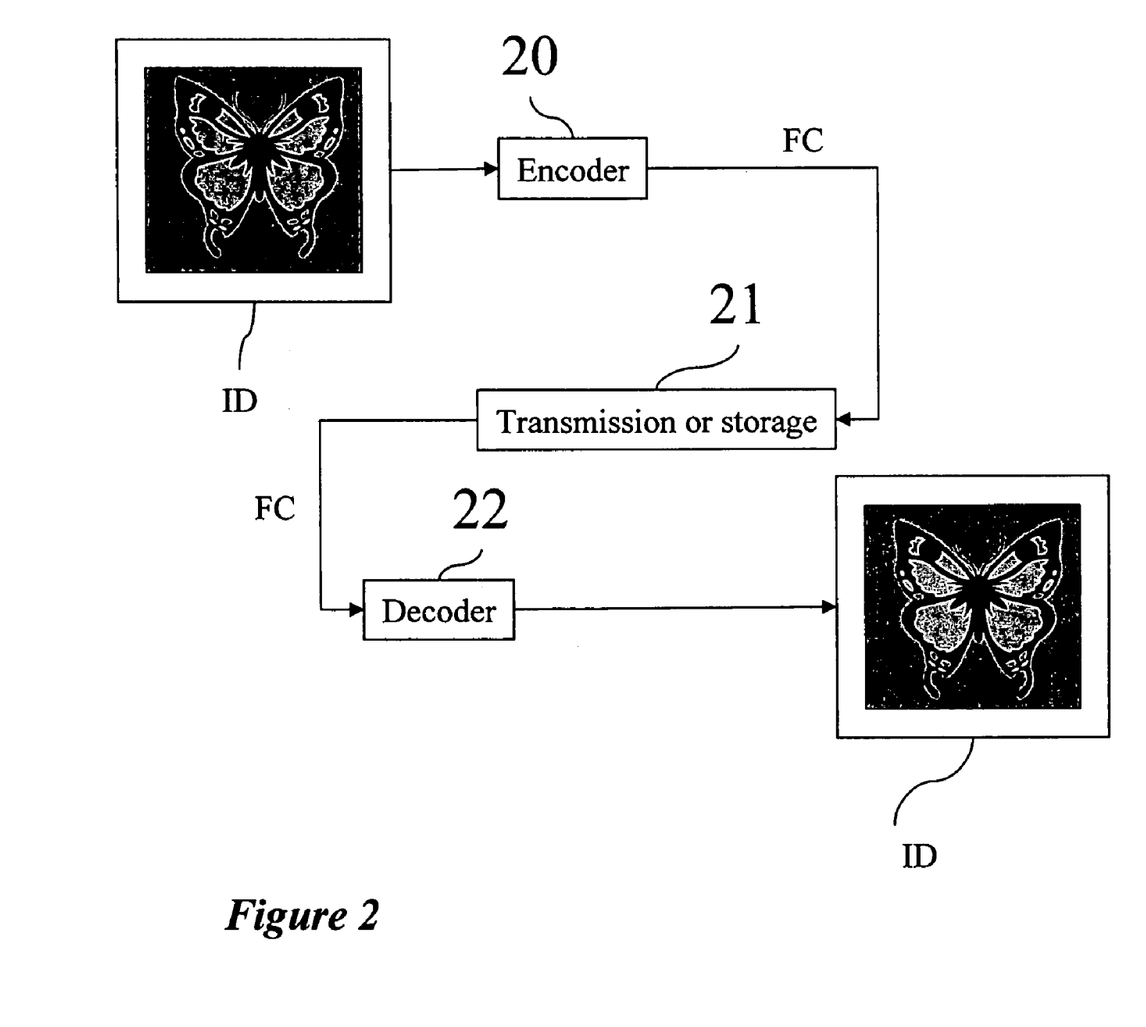
FIG. 2 shows in a simplified manner a method of processing digital images in which the encoding/decoding methods are implemented.

With reference to FIG. 2, a process of processing digital images incorporating an encoding/decoding operation involves the participation of an encoder 20, a device for transmission to a transmission network or to a storage device 21 and a decoder 22.

It will be noted here that the methods of encoding, decoding and accessing according to the invention have a particularly worthwhile application in a telecommunications system comprising a plurality of terminals devices connected via a telecommunications network. The methods of encoding and accessing a region of an image encoded to allow for decoding it according to the invention are then implemented in the terminals devices of the system so as to authorize a transmission of files via the telecommunications network and so reduce the traffic and transmission time.

According to another particularly worthwhile application, the methods according to the invention of encoding and accessing a region of an image encoded to allow for decoding it are implemented in a device for storing multimedia entities so as to be able to store a greater quantity of data in a storage unit.

As represented in FIG. 2, the encoder 20 receives as input an original image IO and comprises an encoding device according to the invention which will be described later with reference to FIG. 3. The image IO is processed by the encoder 20 which outputs an encoded file FC.

The encoded file FC is supplied to the device 21 which is adapted, for example, for transmitting the file via a network or for storing it in a storage unit.

The decoder 22 comprises a decoding device according to the invention. The decoder 22 receives as input the encoded file FC from device 21 and outputs a decoded image ID substantially identical to the original image IO.

For example, the initial data corresponding to the original image IO are arranged in a bidirectional array which is accessible for example row by row.

Figure 3:
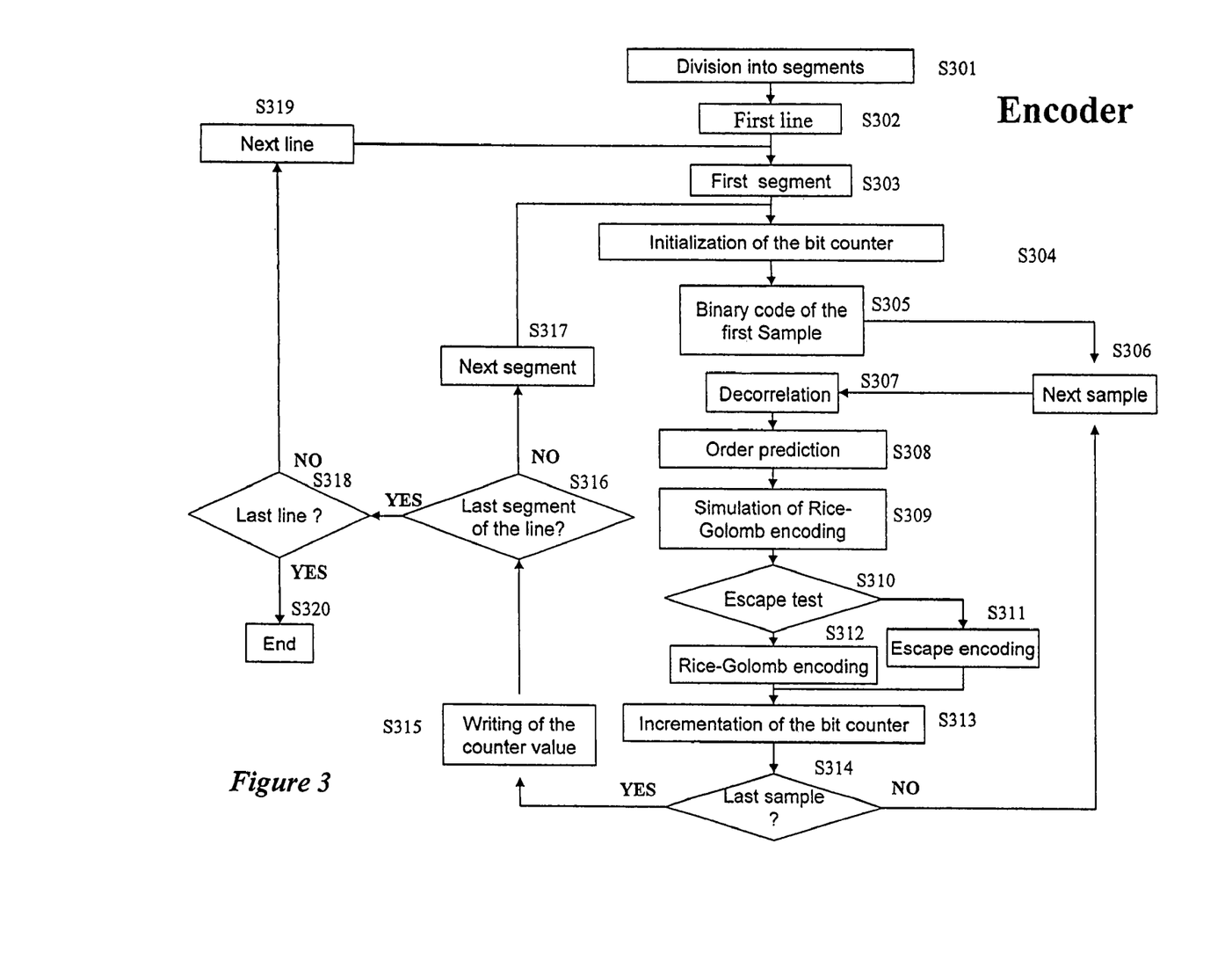
FIG. 3 is an algorithm of an embodiment of the method of encoding an image according to the invention.

The mechanism of encoding the image according to the invention to allow for storing or transmitting it is implemented within the encoding device cited earlier and illustrated by the algorithm of FIG. 3.

The algorithm of FIG. 3 comprises different instructions or portions of software code corresponding to steps of the method according to the invention.

The encoding algorithm comprises a first step S301 of dividing the image into segments. For this, the image is subdivided into P columns each S pixels wide. The pixels common to a column and to a row form a segment.

According to one embodiment, the encoding algorithm provides for going through the image from the first segment of the first row until the last segment of the last row.

According to other embodiments, the order may be a column by column arrangement or may start with the last row.

Step S301 is followed by step S302 which consists of selecting the first row of the image.

Step S302 is followed by step S303 which consists of selecting the first segment of the row, that is to say the segment which is in common with the first of the P columns of the image.

The following step S304 is a step of initializing to 0 the variable of the bit counter. This variable is an item of information representing the size of the encoded segment.

The counter is for example encoded over 16 bits.

Each segment being decomposed into a plurality of samples, step S304 is followed by step S305 which encodes the first sample of each current segment.

The first sample of each segment is, for example, written in its binary form in the data stream. More particularly, in this embodiment, the binary value of the first sample is not decorrelated by a linear prediction.

The binary form of the first sample is, for example, encoded over 12 bits.

According to a variant, the first sample of the segment may be encoded by using the Huffman encoding, with predefined codes. However, it will be noted that other forms of encoding may be employed in variant embodiments.

The process continues at step S306 with the processing of the sample following the current segment, the following sample becoming the current sample. The following samples, from the second to the last sample of the segment, are processed successively in steps S307 to S314 described below.

Step S306 is followed by step S307 which is a step of decorrelating each channel by prediction.

For example, the decorrelation of the signal consists simply of a spatial decorrelation.

More particularly, the decorrelation is of order 1 autoregressive model type. Thus, if the samples of the segment are named $X_1, X_2, \ldots, X_p$, the decorrelated value $Y_i$ corresponding to the sample $X_i$ is:

$Y_i = X_i - X_{i-1}$, i being the position of $Y_i$ and of $X_i$ in the segment.

Thus the decorrelated value $Y_i$ depends on the current sample $X_i$ and the preceding sample $X_{i-1}$.

According to the example defined earlier, the step of decorrelating each channel by prediction may lead to the following results:

$R'_i = R_i - R_{i-1}$
$G'_i = G_i - G_{i-1}$
$B'_i = B_i - B_{i-1}$

At the end of this spatial decorrelation operation, the decorrelated value $Y_i$ is, for example, encoded over 13 bits.

However, more complex predictive schemas may be envisaged.

Step S307 is followed by step S308 consisting of a calculation of order prediction for the Rice-Golomb codes.

The Rice-Golomb encoding constitutes a first type of possible encoding for the samples.

As is known in the field of encoding, Rice-Golomb codes form a family of prefix codes, which are dependent on a positive integer parameter k, also termed "order". Thus the Rice-Golomb encoding of a decorrelated value $Y_i$ is a function of a parameter k. The Rice-Golomb encoding is efficient if the value of the parameter k is optimum for each sample to encode.

It is known from the state of the art that the optimum value of k is the number of significant bits of $Y_i$. However, the decorrelated value $Y_i$ is unknown since it must be decoded.

A conventional approach consists of estimating the value of the digital sample to encode on the basis of available values of samples preceding the digital signal to encode.

This explains why the first sample cannot be encoded in this manner.

Thus, in order to best determine the decorrelated value $Y_i$, an estimation $Z_i$ of $Y_i$ to be encoded is made.

An example of a method for estimating $Z_i$ is described below.

The obtainment of the estimation $Z_i$ takes into account the position of the sample with respect to the beginning of the segment.

In other words, the parameter k is predicted on the basis of the preceding values $Y_i$ in the signal.

More particularly, the value of $Z_i$ is predicted on the basis of the preceding values corresponding to the same channel, and then the parameter k is calculated on the basis of the predicted value $Z_i$.

Thus, knowing an estimation $Z_i$ of the element $Y_i$ to encode, the optimum value of k is the number of significant bits of $Z_i$.

Concerning the first sample of the segment, the order is not predicted since a specific encoding is used as was seen earlier, for example, a binary encoding or a Huffman encoding.

Concerning the second sample of the signal, the prediction is of the form:

$Z_0 = Y_0 / 2^4$

Next, concerning the following samples, the following iterative process is used:

$Z_i = (a \times Z_{i-1} + b \times Y_{i-1})/c$, where a, b, and c are the coefficients chosen for their efficacy in the encoding statistic and $Y_{i-1}$ represents the sample immediately preceding the sample $Y_i$ in the same channel.

These coefficients have, for example, the following respective values: 2, $2^2$ and $2^2$.

Thus, the order k to use in the Rice-Golomb encoding is determined by calculating the number of significant bits of $Z_i$ previously obtained.

The following step S309 is a step of simulating a Rice-Golomb encoding.

Thus, this step provides for calculating the Rice-Golomb code associated with the decorrelated value $Y_i$ and for placing it in memory.

It is known from the state of the art that given the positive integer k dealt with above, a Rice-Golomb code is a succession of bits composed of the following two parts:

a prefix which is a unary code representing $U = \lfloor Y_i/2^k \rfloor$, with $\lfloor x \rfloor$ representing the truncation to the integer portion of x. Thus, the prefix is composed of U bits equal to 1 and one bit equal to 0 represented in the form $(1)^U 0$; and a suffix which is a binary representation of the value $(Y_i - 2^k U)$ encoded over k bits, this is the remainder of the integer division of $Y_i$ by $2^k$.

The Rice-Golomb code of the decorrelated value $Y_i$ is thus calculated as indicated above on the basis of the parameter k determined previously and is placed in memory.

Step S309 is followed by a step S310 which tests the length of the Rice-Golomb code obtained by simulation.

This is because the Rice-Golomb code of a decorrelated value $Y_i$ may produce a code of great length whereas the bit counter, containing the information representing the size of the encoded segment, is of predetermined length. Thus, it is possible that the Rice-Golomb code is of greater length than the length which can be encoded by the bit counter.

As indicated previously, this information is, for example, encoded over 16 bits.

Given the great potential length of the Rice-Golomb codes, it is necessary to introduce a mechanism for size control of the encoded data associated with a segment.

Thus, this step consists of performing a test for exceeding the size of the encoded data associated with a segment. More particularly, if the total length of the Rice-Golomb code is greater than a first predetermined value MAX_TOTAL_LENGTH, or if the length of the Rice-Golomb prefix is strictly equal to a second value PREFIX_LENGTH, then the following step is step S311. In the opposite case, step S310 is followed by step S312.

According to one embodiment, the first predetermined value is equal to 28 and the second predetermined value is equal to 15.

Step S311 consists of writing in the encoded file an Escape code (second type of encoding) corresponding to the current value of the decorrelated value $Y_i$. This Escape code comprises:

a prefix which is a unary code, constituted by n bits equal to 1, n being the length of the PREFIX-LENGTH prefix less 1 followed by a bit equal to 0; this prefix is represented in the following manner: $(1)^n 0$; and a suffix which is a binary representation of $Y_i$ encoded over 13 bits.

Step S311 is then followed by step S313 which will be described later.

As regards step S312, this consists of writing in the file of the encoded data of the image the Rice-Golomb code associated with $Y_i$ and calculated at step S309.

Step S312 is followed by step S313 which consists of incrementing the value of the item of information representing the size of the encoded segment of the number of bits used to encode the current sample $Y_i$.

Step S313 is followed by step S314 which verifies whether the current sample $Y_i$ is the last of the current segment.

Thus, it is verified that the set of the samples of the current segment has in fact been encoded.

If that is not the case, step S314 is followed by step S306 described earlier.

Otherwise, the following step is the step S315 which provides for writing in the file of the encoded data of the image, over a predetermined number of bits, the value of the item of information representing the size of the segment corresponding to the bit counter.

As described previously, the value is, for example, encoded over 16 bits.

Figure 3A:
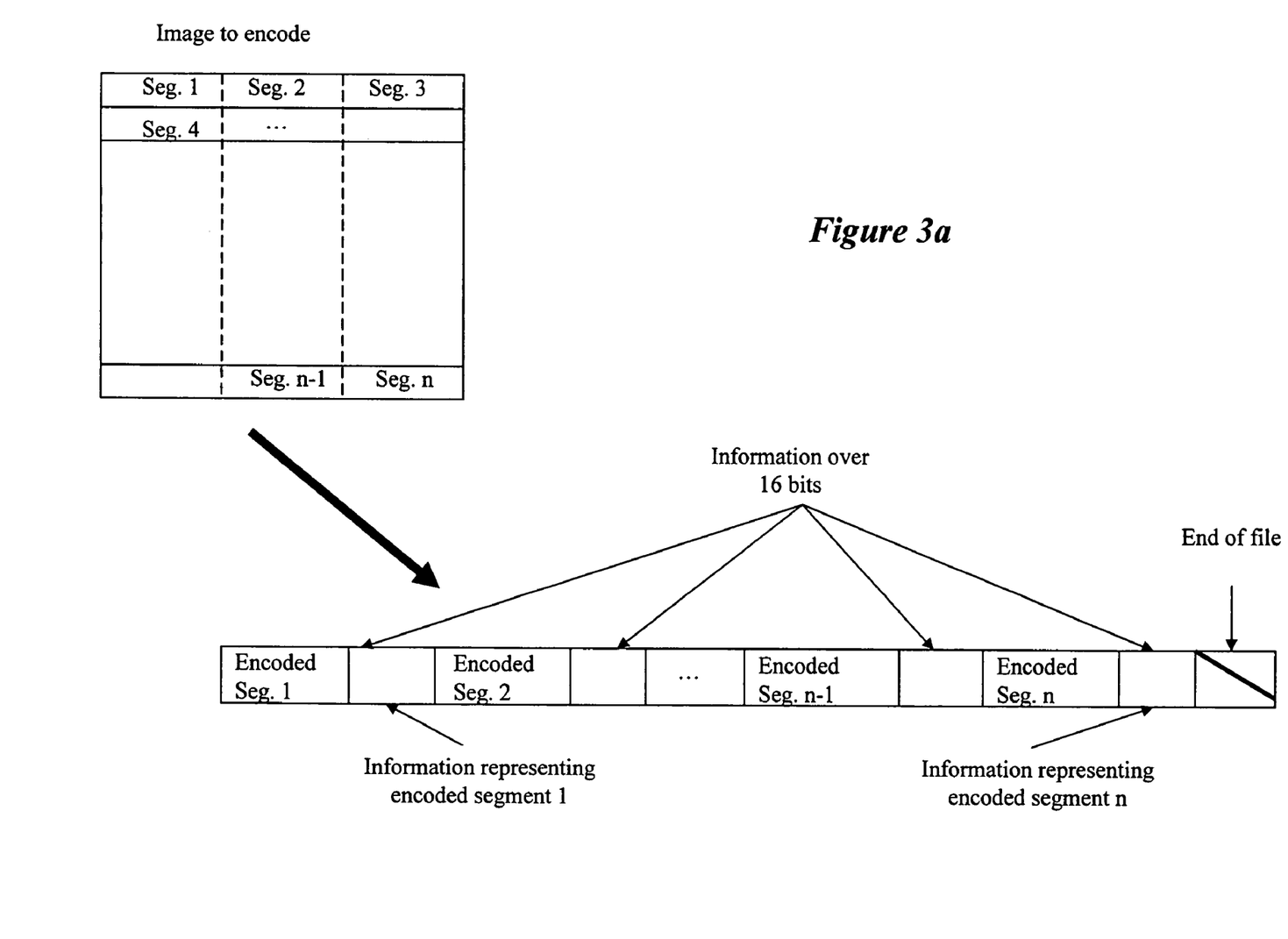
FIG. 3a is a diagram of a result of encoding arising from the method of encoding an image according to the invention.

As illustrated in FIG. 3a, each segment of the image is encoded in a file, then is followed by the information representing the size of the segment which precedes it in the direction of the order. This information is encoded over a fixed number of bits.

Step S315 is followed by step S316 which verifies whether the current segment is the last segment of the current row of the image to encode.

If this is not the case, step S316 is followed by step S317 which consists of determining the following segment. Thus, in the direction of the order, the following segment in the current row becomes the current segment.

The following step is the step S304 of initializing the bit counter, described previously.

Returning to step S316, if the current segment is the last of the row, step S316 is followed by step S318.

During this step S318, it is verified whether the current row is the last row of the image to encode. If that is the case, it terminates the algorithm of FIG. 3 at step S320.

In the opposite case, step S318 is followed by step S319 which consists of determining the following row to encode.

Thus the following row in the image becomes the current row. The following step is the step S303 of determining the first segment of the current row, described previously.

The encoding of the image according to the method of which the algorithm is illustrated in FIG. 3 is thus performed by going through the segments of the image in the direction of their order which corresponds here to the natural order of scanning the image: from the first segment of the first row to the last segment of the last row.

It will now be considered that a user wishes to decode a portion of the encoded image according to the method described previously. For this, the file containing the encoded image will be gone through in the reverse order of the data in the file.

According to the method of the invention, the information representing the size of the last segment written at the end of the file is read, and on the basis of that information the address of the last segment is determined.

Then the segments are gone through one by one in reverse order, while at the same time decoding the current segment if it belongs to the region of the image to be accessed and which was defined previously by the user.

The definition of the region of the image to be accessed and thus to be decoded is supplied by the user and is characterized by descriptive parameters of the region of the image to be accessed. This region may take different forms, for example, a rectangle, a circle, or a star.

For example, the coordinates of a rectangular region may be defined by the index of the first row and the index of the pixel in the first column of the selected region, as well as by the index of the last row and the index of the pixel in the last column of that region.

It is also possible to define the region on the basis of coordinates of a corner of that region and by its size (height and length).

This procedure may also be performed iteratively using the mouse, by defining a rectangle within a frame itself representing the original image.

Figure 4:
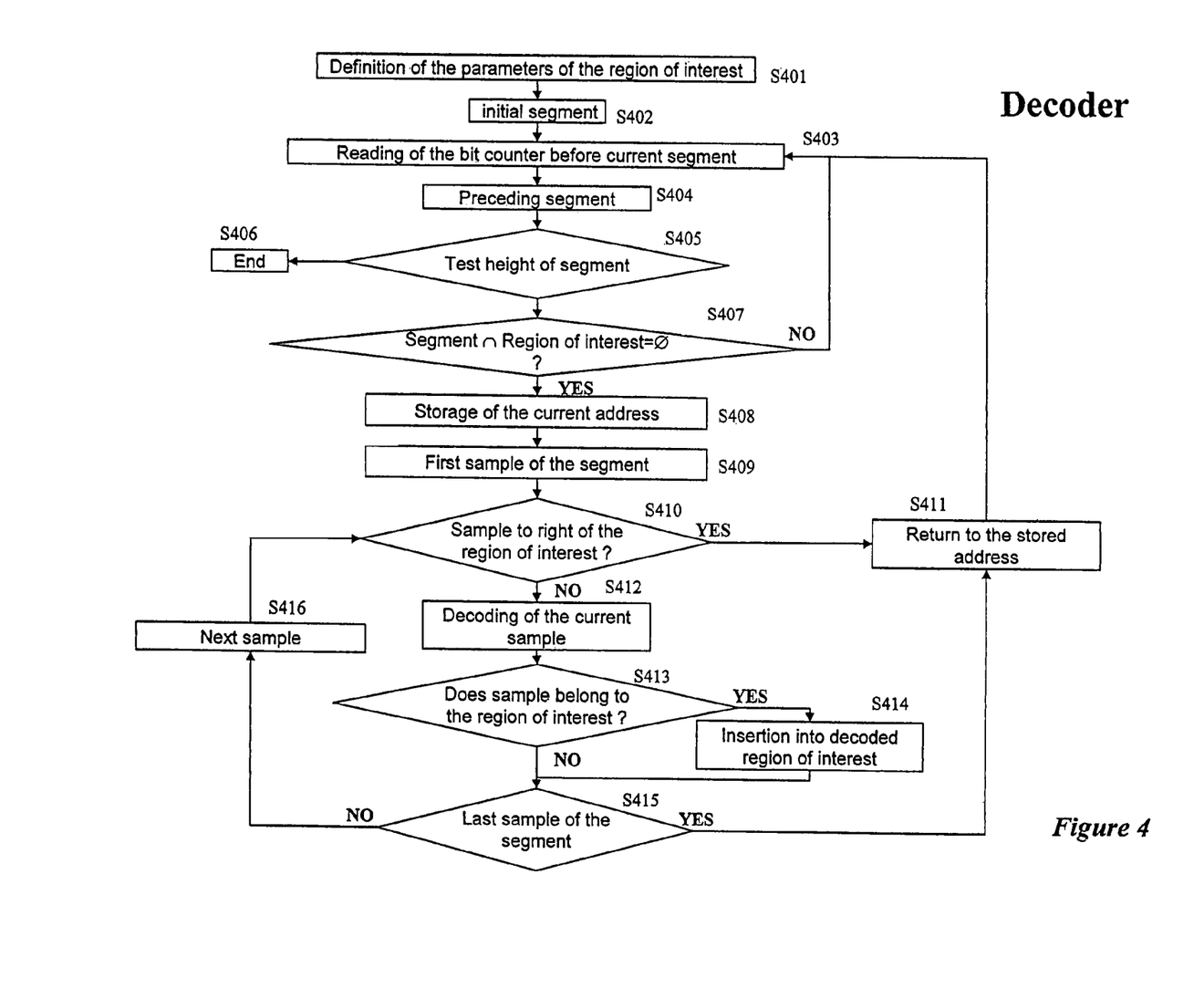
FIG. 4 is an algorithm of an embodiment of the method of accessing a region of an image and decoding that region according to the invention.

The access to a region of an image according to the invention in order to decode it to make it viewable by the user is implemented during the decoding of the sequences of the image and is illustrated by the algorithm of FIG. 4.

The algorithm of FIG. 4 comprises different instructions or portions of software code corresponding to steps of the method according to the invention.

The algorithm comprises a first step S401 of defining the parameters of the region of the image to be accessed and which is defined by the user.

This step makes provision either for entering parameters of the region of the image to be accessed, or for graphically defining that region, for example by the selection of a region within a frame itself representing the original image, for example using the mouse.

Step S401 is followed by step S402 which initializes the identifier of the current segment at the initial segment.

The initial segment is, for example, a pointer situated after the last segment of the image. Thus, in this case, the current segment is identified by the end of the file.

Step S402 is followed by step S403 during which the reading pointer situated on the current segment is repositioned in order to be able to read the value of the information representing the size (bit counter) of the preceding segment, that is to say of the segment situated before the current segment in the order created.

This information is encoded, for example, over 16 bits.

Step S403 is followed by step S404 which provides for reading the preceding segment.

During this step, the reading pointer of the encoded image is positioned on the preceding segment, by moving the reading pointer in the file by the number of bits corresponding to the value of the information representing the size of the associated segment read at the previous step S403.

The preceding segment then becomes the new current segment.

Step S404 is followed by step S405 which verifies that the current segment is not situated outside the region of the image to be accessed.

During this step, it is verified, for example, whether the current segment is situated beyond the highest row of the region of the image to be accessed.

This step for example performs a comparison of the row in which the current segment is found with the first row of the region of the image to be accessed.

If the row in which the current segment is found is above the first row of the region of the image to be accessed, then all the data necessary for the selected region of the image to be accessed have already been extracted.

The decoding is then terminated (step S406), which terminates the algorithm of FIG. 4.

In the opposite case, step S405 is followed by step S407.

During step S407, it is verified that the current segment belongs to the region of the image to be accessed.

This test consists of verifying that the current segment and the region of the image to be accessed have pixels in common.

In the affirmative, the segment must be decoded, and thus the following step S408 is a step of storing the current address of the current segment.

In the opposite case, the following step is step S403, described earlier, consisting of reading the information representing the size of the new preceding segment with respect to the current segment dealt with above.

Returning to step S408, the start address of the data constituting the current segment in the encoded image will be stored in a variable identifying the current address, the start address of the data constituting the current segment being the address of the segment.

Step S408 is then followed by step S409 which will select the first sample of the current segment and which becomes the current sample.

During the following step S410, it is verified that the current sample is to the right of the region of the encoded image to be accessed.

This test is for example performed by comparing the address of the current sample with the parameters of the region of the image to be accessed and thus by determining whether the current sample is situated to the right of the region of the image to be accessed.

In the affirmative, the following step constitutes the step of returning to the previously stored address (S411).

In the opposite case, that is to say when the current sample is either in the region of the image to be accessed or to the left of the image to be accessed, the following step S412 consists of decoding the current sample.

According to a variant, step S409 is directly followed by step S412. This implementation enables the implementation of this decoding method to be simplified. However, the path is greater since the segment is gone through in its entirety, the consequence of which is to increase the processing time of the decoding method.

Step S411 consists of positioning the current address at the previously stored address, that is to say the start address of the current segment.

Step S411 is followed by step S403 described earlier, which will obtain the information representing the size of the new preceding segment, and thus the determination of that preceding segment.

Figure 5:
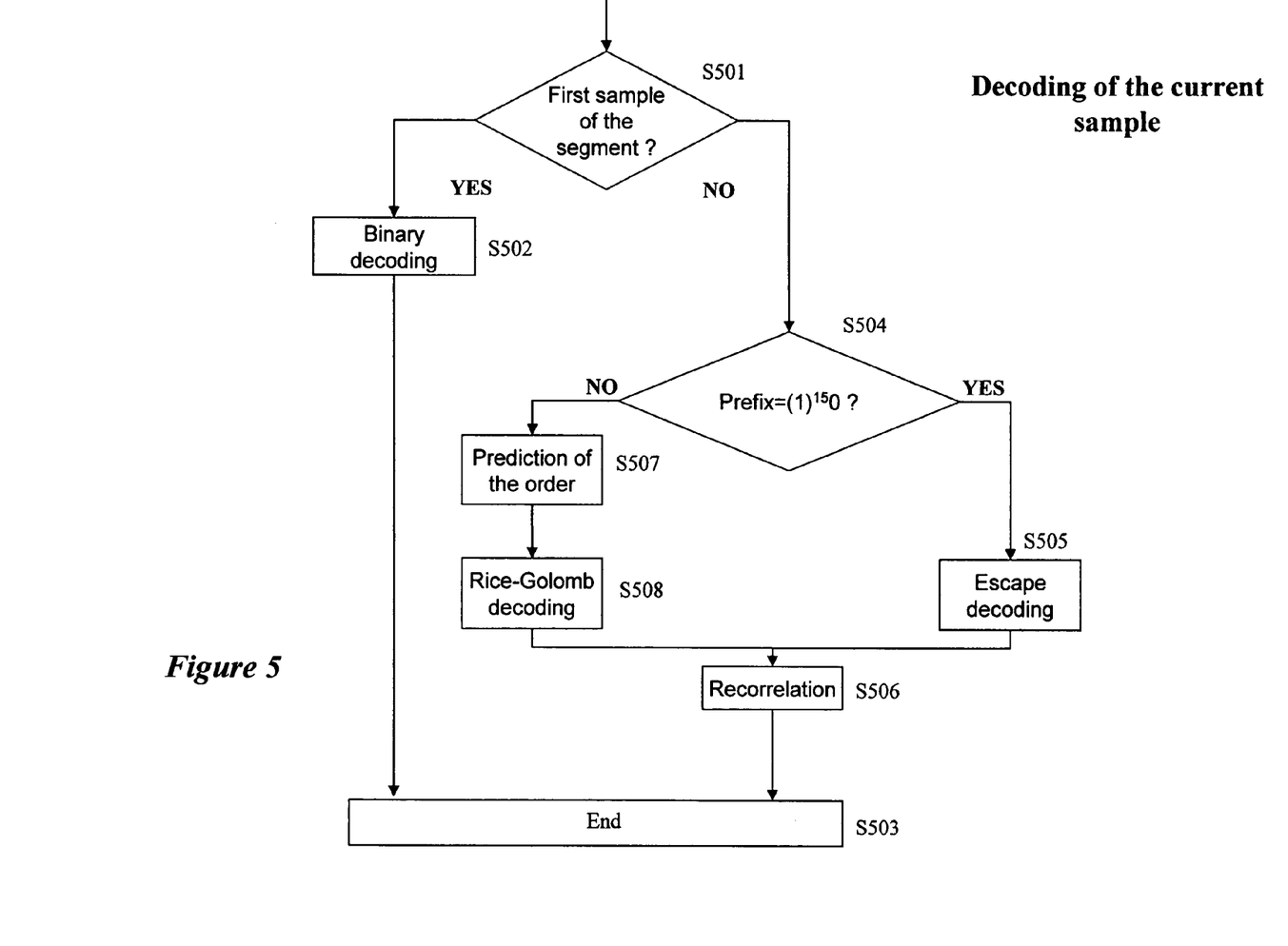
FIG. 5 is an algorithm detailing a method of decoding the current sample.

Returning to step S412, the detail of this decoding step of the current sample is provided by the following description, made with reference to FIG. 5 which illustrates an algorithm completing that of FIG. 4.

However, other decoding modes may be envisaged.

The algorithm of FIG. 5 comprises a first step S501 which verifies whether the current sample is the first sample of the current segment.

In the affirmative, step S501 is followed by step S502 of decoding the first sample.

Step S502 decodes the first sample of the segment by binary decoding.

This decoding is, for example, a simple binary decoding over 12 bits.

According to one variant, the first sample of the segment may be decoded by using the Huffman code.

The decoding algorithm of FIG. 5 is then terminated by a step S503.

In the opposite case in which the sample is not the first segment, step S501 is followed by step S504.

Step S504 consists of verifying the prefix of the sample to decode. For this, the prefix of the sample U is read. This prefix is in the from of a series of bits of value '1' followed by a bit having the value '0'.

If this series has a determined length PREFIX_LENGTH of bits of value '1' then step S504 is followed by step S505 which will decode the sample using the Escape decoding.

Step S505 reads the binary value of $Y_i$ for example, encoded over 13 bits in the encoded image. Step S505 is followed by step S506.

Step S506 concerns a step of recorrelation in order to perform the reverse schema of that described at the decorrelation step performed on encoding.

For example, an autogressive order 1 decoding is performed in the following manner:

$X_i = Y_i + X_{i-1}$

According to the example defined earlier, the step of recorrelating each channel by prediction may take the following form:

$R_i$=Estimation of $R_i + R_{i-1}$
$G_i$=Estimation of $G_i + G_{i-1}$
$B_i$=Estimation of $B_i + B_{i-1}$ The decoding algorithm of FIG. 5 is then terminated by step S503.

Returning to step S504, in the opposite case, the following step is step S507 which is a step of predicting the Rice-Golomb order.

The predicting step performed on encoding can be reproduced during the decoding. The detailed manner of obtaining the value $Z_i$ serving for the prediction of the order takes into account the position of the sample with respect to the beginning of the segment.

If the current sample is the second sample of the segment, the prediction is of the form:

$Z_o = Y_o / 2^4$

Next, concerning the other samples going from the third till the last sample of the segment, the following iterative process is used:

$Z_i = (a \times Z_{i-1} + b \times Y_{i-1})/c$, where a, b, and c are some particular coefficients chosen for their decompression statistical efficiency.

These coefficients have, for example, the following respective values: 2, $2^2$ and $2^2$.

Once this has been done, the order k will be defined which will be used during the Rice-Golomb decoding as the number of significant bits of $Z_i$.

Step S507 is followed by step S508 which will decode the sample using the Rice-Golomb decoding based on the order k obtained at step S507.

The value of the order k having being defined at the previous step, it is possible to perform the following calculation of $Y_i$:

$Y_i = U \times 2^k$, where U is the prefix read at the prefix test step at step S504.

Next, the method provides for extracting the k bits from the data stream, these k bits forming a binary representation B. The value corresponding to this binary representation B is then added to $Y_i$. $Y_i$ is thus obtained in the following manner:

$Y_i = U \times 2^k + B$

Step S508 is then followed by step S506 described earlier and by step S503 terminating the algorithm of FIG. 5 and thus step S412 of the algorithm of FIG. 4.

Step S412 is then followed by the step S413 which consists of verifying whether the current sample and the region of the image to be accessed have pixels in common.

For this, the coordinates of the sample are compared with the coordinates of the region of the image to be accessed.

In the affirmative, step S413 is followed by step S414 in order to insert the current sample in the region of the decoded image.

In the opposite case, the following step is step S415.

Step S414 consists of inserting the current sample in the decoded image which represents the region of the image to be accessed.

Step S414 is followed by step S415 which provides for testing the current sample in the current segment in course of being processed, and, more particularly, of testing whether the current sample is the last of the current segment.

In the negative, step S415 is followed by step S416 which selects the following sample, the following sample then becoming the current sample to be processed. Step S416 is then followed by step S410 described earlier.

In the opposite case, step S415 is followed by step S411, described earlier, making it possible to reposition the reading pointer of the encoded image already described.

According to this embodiment, the algorithm terminates at step S406 when all the data necessary for the selected region of the image to be accessed have been extracted.

According to a variant, the method of encoding can be used for the preparation of temporary encoded data. Thus, the data which is encoded by the above method corresponds to such temporary encoded data which is under an intermediate data format.

This temporary encoded data is then modified into a common data format which can be used by any common decoding devices receiving the encoded data.

More particularly, the temporary encoded data is modified by including the information representing the size of the encoded data in a header, this header being readable by any common decoding devices.

Figure 6:
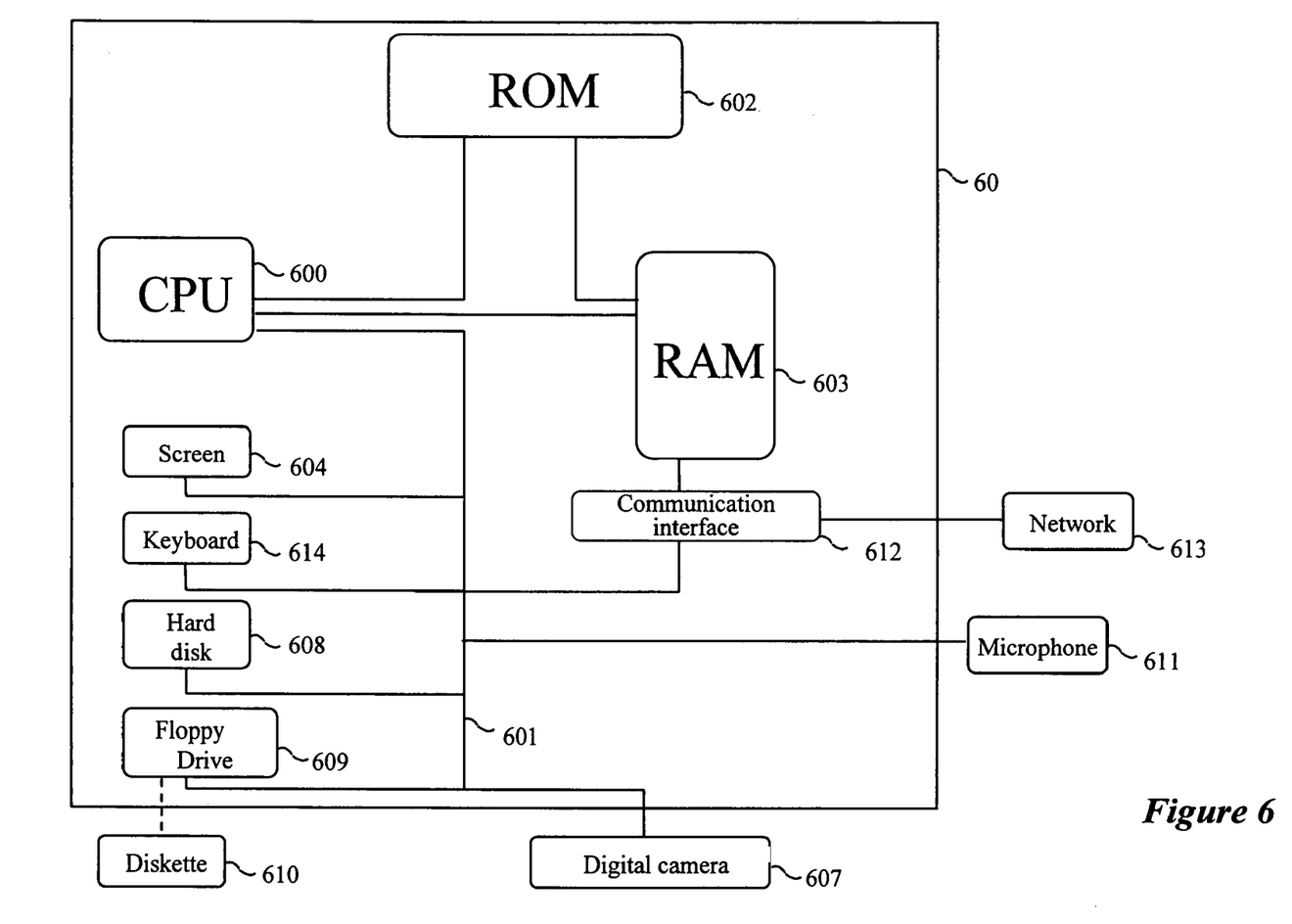
FIG. 6 is a diagram of an apparatus in which the invention is implemented.

With reference to FIG. 6, a device adapted for the implementation of the invention will now be described.

The device of FIG. 6 has all the means necessary for the implementation of embodiments of the invention.

With reference to FIG. 6, a device or machine for information processing adapted to operate as a device for encoding multimedia entity digital signals and/or as a device for accessing and decoding multimedia entity digital signals according to the invention will now be described essentially in terms of its hardware configuration.

The information processing device permits an implementation of the method of encoding multimedia entity digital signals and/or the method of accessing and decoding multimedia entity digital signals according to the invention. More specifically, such an information processing device may contain the entirety, or only a portion, of the methods according to the invention described herein.

According to the embodiment chosen, this device may for example be a microcomputer 60 connected to different peripherals, for example a digital camera 607 (or a scanner, or any other image acquisition or storage means) connected to a graphics card and thus supplying the information to be processed according to the invention.

The micro-computer 60 preferably comprises a communication interface 612 connected to a network 613 adapted to transmit digital information. The microcomputer 60 also comprises a storage means 608, such as a hard disk, as well as a floppy drive 609.

The diskette 610 as well as the hard disk 608 can contain software installation data of the invention as well as the code of the invention which, once read by the micro-computer 60, will be stored on the hard disk 608.

According to a variant, the program or programs enabling the device 60 to implement the invention are stored in a read only memory ROM 602, and the same applies to the encoding/decoding methods.

As another variant, the program or programs are received entirely or partially via the communication network 613 to be stored in identical manner to that described above.

The micro-computer 60 may also be connected to a microphone 611 through an input/output card (not shown). The microphone 611 is useful in particular when the data to be processed in accordance with the methods of the invention are audio data.

The micro-computer 60 also comprises a screen 604 for viewing the information to be processed and/or serving as an interface with the user, such that the user may for example parameterize certain processing modes using the keyboard 614 or any other means, for example a mouse.

The central processing unit CPU 600 executes the instructions relating to the implementation of the invention, which are stored in the read only memory ROM 602 or in the other storage means.

On powering up, the processing programs and methods stored in one of the non-volatile memories, for example the ROM 602, are transferred into the random access memory RAM 603, which will then contain the executable code of the invention, as well as the variables necessary for implementing the invention.

As a variant, the processing methods may be stored in different storage locations of the device 60. Generally, an information storage means, which can be read by a computer or microprocessor, integrated or not into the device, and which may possibly be removable, stores a program implementing the method of accessing, encoding and respectively decoding. It will also be possible to modify an embodiment of the invention, for example, to give an improved embodiment, by adding processing methods brought up to date or improved that are transmitted by the communication network 613 or loaded via one or more diskettes 610. Naturally, the diskettes 610 may be replaced by any type of information carrier such as CD-ROM, or memory card.

A communication bus 601 enables communication between the different elements of the micro-computer 60 and the elements connected thereto. It will be noted that the representation of the bus 601 is non-limiting. Thus the central processing unit CPU 600 may for example communicate instructions to any element of the micro-computer 60, directly or via another element of the micro-computer 60.

Of course, the present invention is in no way limited to the embodiments described and represented, but encompasses, on the contrary, any variant form within the capability of the person skilled in the art.

The invention claimed is:

1. A method for accessing a region of an encoded image comprising a plurality of segments that are encoded and stored according to a predetermined encoding order, wherein the method comprises:

a step of comparing a position of the current encoded segment with the region of the encoded image to be accessed;

a step of selecting the type of decoding of the current encoded segment according to the result of the comparing step; and a step of repeating the comparing step and the selecting step, on a preceding encoded segment, the preceding encoded segment preceding the current encoded segment in an encoding order, wherein the steps are performed by a processor.

2. The method according to claim 1, further comprising:
a step of positioning at the preceding encoded segment; and
a step of determining the address of the preceding encoded segment on the basis of the address of the current encoded segment.

3. The method according to claim 1, wherein an item of information representing the size of an encoded segment is associated with each encoded segment of the image.

4. The method according to claim 3, wherein the encoded segment is followed by the item of information representing the size of the encoded segment.

5. The method according to claim 3, wherein the item of information representing the size of the encoded segment is encoded over a predetermined number of bits.

6. The method according to claim 2, wherein an item of information representing the size of the encoded segment is associated with each encoded segment of the image and the step of positioning includes:
a step of obtaining the item of information representing the size of the preceding encoded segment in the direction of the order; and
a step of determining the address of the preceding encoded segment on the basis of the address of the current encoded segment and of the item of information obtained.

7. The method according to claim 1, further comprising:
applying the steps to encoded segments for as long as the current encoded segment belongs to a row of the region of the image to be accessed.

8. The method according to claim 1, wherein each segment comprises a plurality of samples and the decoding of the current encoded segment includes:
a step of comparing a current sample with the region of the image to be accessed; and
a step of, according to the result of the comparing, deciding the type of decoding of the current sample.

9. The method according to claim 8, wherein the step of comparing the current sample with the region of the image to be accessed includes:
comparing the position of the current sample with a right hand end of the region of the encoded image to be accessed.

10. A method according to claim 8, wherein the method of decoding includes:
a step of decoding using one type of decoding of at least two types of decoding.

11. A method according to claim 10, wherein a first type of decoding is a Rice-Golomb decoding and a second type of decoding is an Escape decoding.

12. A method according to claim 10, wherein the type of decoding applied is based on a feature present in the current segment.

13. A method according to claim 11, wherein the type of decoding applied depends on a feature present in the current sample and the feature is the length of a prefix of the Rice-Golomb code.

14. The method according to claim 1, wherein the plurality of segments are put in order going from the first segment of the first row of the image until the last segment of the last row of the image.

15. A method of encoding an image comprising a plurality of segments to form a data stream, wherein said segments are encoded according to a predetermined encoding order, the method comprising:
a step of encoding of a current segment thereby forming a current encoded segment;
a step of inserting an item of information representing a size of the current encoded segment in the data stream after the current encoded segment; and
a step of applying the encoding step and the inserting step to a segment following the current encoded segment in an encoding order,
wherein the steps are performed by a processor.

16. The method according to claim 15, wherein an item of information representing the size of the encoded segment is encoded over a predetermined number of bits.

17. The method according to claim 15, wherein each segment comprising a plurality of samples and the encoding of the current segment comprises applying to at least one sample of a current segment:
simulating encoding of a sample using a first type of encoding; and
selecting, based on the result of the simulation, a type of encoding of the sample using said first type of encoding or encoding using at least one second type of encoding.

18. The method according to claim 17, wherein the selecting of the type of encoding is based on a resulting size of the sample encoded during said simulating using the first type of encoding.

19. The method according to claim 17, wherein the first type of encoding is a Rice-Golomb encoding and a second type of encoding is an Escape encoding.

20. The method according to claim 17, wherein the encoding of the first sample of a segment is of a type different from the first type of encoding and the second type of encoding.

21. A device for accessing a region of an encoded image comprising a plurality of segments that are encoded and stored according to a predetermined encoding order, wherein the device comprises:
a processor coupled to a memory storing instructions, which when executed by the processor cause the processor to:
compare a position of the current encoded segment with the region of the encoded image to be accessed;
select a type of decoding of the current encoded segment according to the result of the comparison; and
repeating the comparing and the selecting, on a preceding encoded segment, the preceding encoded segment preceding the current encoded segment in an encoding order.

22. The device according to claim 21, wherein the instructions, which when executed by the processor, further cause the processor to:
position at the preceding encoded segment; and
determine the address of the preceding encoded segment on the basis of the address of the current encoded segment.

23. The device according to claim 21, wherein an item of information representing the size of an encoded segment is associated with each encoded segment of the image.

24. The device according to claim 23, wherein the encoded segment is followed by the item of information representing the size of the encoded segment.

25. The device according to claim 23, wherein the item of information representing the size of the encoded segment is encoded over a predetermined number of bits.

26. The device according to claim 23, wherein the encoded segment is followed in the direction of the order by the item of information representing the size of the encoded segment and the preceding encoded segment is positioned by:
obtaining the item of information representing the size of the preceding encoded segment in the direction of the order; and determining the address of the preceding encoded segment on the basis of the address of the current encoded segment and of the item of information obtained.

27. The device according claim 21, wherein each segment comprises a plurality of samples and the current encoded segment is decoded by:
   comparing a current sample with the region of the image to be accessed; and
   deciding a type of the decoding of the current sample according to the result of the comparison.

28. The device according to claim 27, wherein the current sample is compared with the region of the image to be accessed by comparing the position of the current sample with the right hand end of the region of the image to be accessed.

29. The device according to claim 27, wherein the current encoded segment is decoded using one type of decoding of at least two types of decoding.

30. The device according to claim 29, wherein a first type of decoding is a Rice-Golomb decoding and a second type of decoding is an Escape decoding.

31. The device according to claim 29, wherein the type of decoding to apply depends on a feature present in the current sample.

32. The device according to claim 30, wherein the type of decoding to apply depends on a feature present in the current sample and the feature is the length of the prefix of the Rice-Golomb code.

33. The device according to claim 21, wherein the segments are put in order going from the first segment of the first row of the image until the last segment of the last row of the image.

34. A device for encoding an image comprising a plurality of segments to form a data stream, wherein said segments are encoded according to a predetermined encoding order, the device comprising: a processor coupled to a memory storing instructions, which when executed by the processor cause the processor to:
   encode a current segment thereby forming a current encoded segment; and
   insert an item of information representing a size of the current encoded segment in the data stream after the current encoded segment in the direction of the order of encoding, and
   wherein the encoding and the inserting act on the plurality of segments in the order of encoding.

35. The device according to claim 34, wherein the item of information representing the size of the encoded segment is encoded over a predetermined number of bits.

36. The device according to claim 34, wherein each segment comprises a plurality of samples and the current segment is encoded by:
   simulating encoding of a sample using a first type of encoding; and
   selecting, based on the result of simulating, a type of encoding of the sample using said first type of encoding or encoding using at least one second type of encoding.

37. The device according to claim 36, wherein the the type of encoding is selected based on a resulting size of the sample encoded by said simulating using the first type of encoding.

38. The device according to claim 36, wherein the first type of encoding is a Rice-Golomb encoding and a second type of encoding is an Escape encoding.

39. The device according to claim 36, wherein the encoding of the first sample of a segment is of a type different from the first type of encoding and second type of encoding.

40. A telecommunications system comprising a plurality of terminal devices connected via a telecommunications network, the plurality of terminal devices including:
   at least one terminal device including a processor and a memory unit coupled to said processor, the at least one terminal device operable to:
      compare a position of a current encoded segment with the region of the encoded image to be accessed,
      select a type of decoding of the current encoded segment according to the comparison, and
      repeat the comparison and selection, on a preceding encoded segment, the preceding encoded segment preceding the current encoded segment in an encoding order; and
   at least one terminal device including a processor and a memory unit coupled to said processor, the at least one terminal device operable to:
      encode a current segment,
      insert an item of information representing the size of the encoded segment after the current encoded segment in the direction of the order of encoding, and
      wherein the encoding and inserting act on a plurality of segments in the order of encoding.

41. A computer-readable medium storing computer executable code which when executed by a computer processor causes the computer processor to perform the steps according to claim 1.

42. A computer-readable medium storing computer executable code which when executed by a computer processor causes the computer processor to perform the steps according to claim 15.

* * * * *